(12) United States Patent
Seed

(10) Patent No.: US 7,594,451 B2
(45) Date of Patent: Sep. 29, 2009

(54) TRANSMISSION SELECTOR MECHANISM

(75) Inventor: Jonathan Seed, Coventry (GB)

(73) Assignee: AGCO Ltd (GB)

( * ) Notice: Subject to any disclaimer, the term of this patent is extended or adjusted under 35 U.S.C. 154(b) by 259 days.

(21) Appl. No.: 11/578,932

(22) PCT Filed: Apr. 6, 2005

(86) PCT No.: PCT/GB2005/001345
§ 371 (c)(1),
(2), (4) Date: Jul. 30, 2007

(87) PCT Pub. No.: WO2005/103532
PCT Pub. Date: Nov. 3, 2005

(65) Prior Publication Data
US 2008/0156136 A1    Jul. 3, 2008

(30) Foreign Application Priority Data
Apr. 20, 2004   (GB) .................................. 0408729.2

(51) Int. Cl.
*B60K 20/00* (2006.01)
*G05G 9/00* (2006.01)
(52) U.S. Cl. .................... 74/473.1; 74/337.5; 74/473.2; 74/479.01
(58) Field of Classification Search ................ 74/473.2, 74/473.21, 473.24, 473.36, 337.5, 473.1, 74/473.31, 479.01
See application file for complete search history.

(56) References Cited

U.S. PATENT DOCUMENTS

| 901,456 | A |  | 10/1908 | Loitron |
| 2,247,491 | A | * | 7/1941 | Groene et al. ............. 74/473.33 |
| 2,329,354 | A | * | 9/1943 | McCarter ..................... 74/333 |
| 3,500,697 | A |  | 3/1970 | Schowalter |
| 3,800,614 | A | * | 4/1974 | Johnson ..................... 74/473.2 |

(Continued)

FOREIGN PATENT DOCUMENTS

EP    0321453    6/1993

(Continued)

OTHER PUBLICATIONS

British Search Report for British Application Serial No. GB0408729.2 dated Jul. 29, 2004.

*Primary Examiner*—Richard W L Ridley
*Assistant Examiner*—Phillip Johnson

(57) ABSTRACT

A transmission selector mechanism for controlling a gearbox which provides forward/reverse direction and high/low ratios using two coupling members (6', 53:7', 54) each axially slideable in both directions either side of the a respective neutral position to couple a selected one of a pair of gears (10, 12:11, 13) to an associated shaft (4, 5). The mechanism includes a driver operated forward/reverse selector member (50) and a driver operated high/low ratio selector member (52). The forward/reverse selector member (50) moves a first selector formation (64, 64b) which is engageable with a first coupling formation means (66) on a first cam (61) which moves one of the coupling members (7', 54). The high/low selector member (52) moving a second selector formation (63, 63b, 63c) which is engageable with a second coupling formation means (65) on a second cam (58) which moves the other coupling member (6', 53). One of the selector formations (63, 63b, 63c) engages both coupling formation means (65, 66) for simultaneous movement of both couplers (6', 7') when selecting certain direction/ratio changes.

8 Claims, 17 Drawing Sheets

U.S. PATENT DOCUMENTS

| | | | | |
|---|---|---|---|---|
| 3,955,437 | A | * | 5/1976 | Heintz ........................ 74/473.2 |
| 4,054,083 | A | * | 10/1977 | Utter ........................... 91/523 |
| 4,228,693 | A | * | 10/1980 | Kelbel ......................... 74/339 |
| 5,145,469 | A | * | 9/1992 | Lasoen ....................... 475/209 |

FOREIGN PATENT DOCUMENTS

| | | |
|---|---|---|
| GB | 2170565 | 8/1986 |
| JP | 05248539 | 9/1993 |

* cited by examiner

| DIRECTION | SPEED | UPPER COUPLER | LOWER COUPLER |
|---|---|---|---|
| FORWARD | LOW | LEFT | LEFT |
| FORWARD | HIGH | RIGHT | RIGHT |
| REVERSE | LOW | LEFT | RIGHT |
| REVERSE | HIGH | RIGHT | LEFT |

TRANSMISSION SELECTOR MECHANISM

This invention relates to transmission ratio selector mechanisms for use with transmission stages of the type including two coupling members both of which are slidable either side of their respective neutral positions to couple a selected one of a respective pair of gears to a respective shaft and both of which must be engaged to provide drive through the transmission stage.

GB-B-2055162 discloses an example of such a transmission stage which is used as an input stage into a multi-ratio tractor transmission.

It is an object of this present invention to provide an improved form of transmission ratio selector mechanism suitable for use with a transmission stage of the type described above.

Thus according to the present invention there is provided a transmission selector mechanism for controlling a gearbox which provides forward/reverse direction and high/low ratios using two coupling members each axially slideable in both directions either side of a respective neutral position to couple a selected one of a pair of gears to an associated shaft, the mechanism includes a driver operated forward/reverse selector member and a driver operated high/low ratio selector member, the forward/reverse selector member moving a first selector formation which is engageable with a first coupling formation means on a first cam which moves one of the coupling members, the high/low selector member moving a second selector formation which is engageable with a second coupling formation means on a second cam which moves the other coupling member, one of the selector formations engaging both coupling formation means for simultaneous movement of both couplers when selecting certain direction/ratio changes so that by appropriate movement of the selector members the coupling members can be positioned in the four possible positions either on the same side or on opposite sides of their respective neutral positions.

Preferably the selector formation connected with the high/low ratio changes engages both coupling formations.

Preferably also the cams are located one above the other and pivot about the same aligned axes.

Preferably the first selector formation connected with the forward/reverse selector member engages the first coupling formation means in the form of a first cam track in the first cam, and the second selector formation connected with the high/low selector member engages the first cam track and also engages the second coupling formation means in the form of a second cam track in the second cam.

The invention also provides a transmission including a transmission selector mechanism as defined above.

The invention will now be described, by way of example only, with reference to the accompanying drawings in which:—

Figure 2:
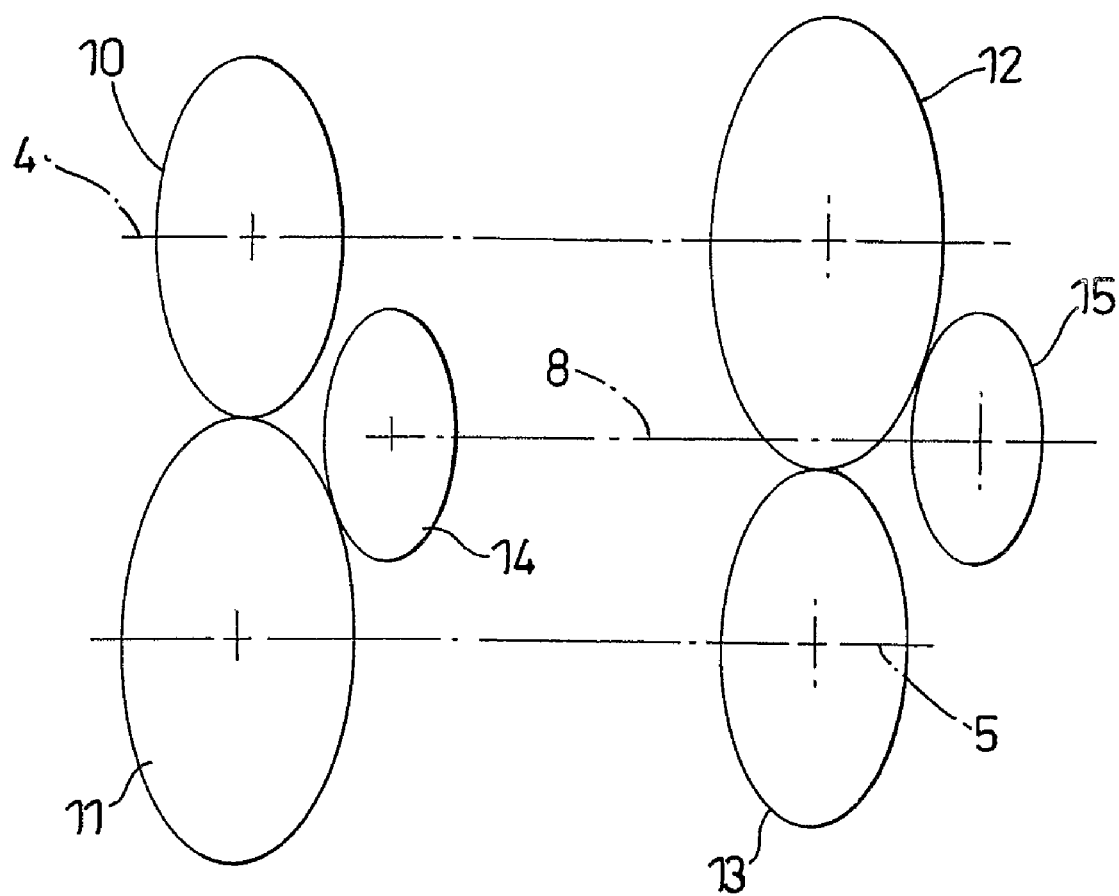
FIG. 2 show diagrammatically the input stage of the transmission of FIG. 1.
Figure 3A:
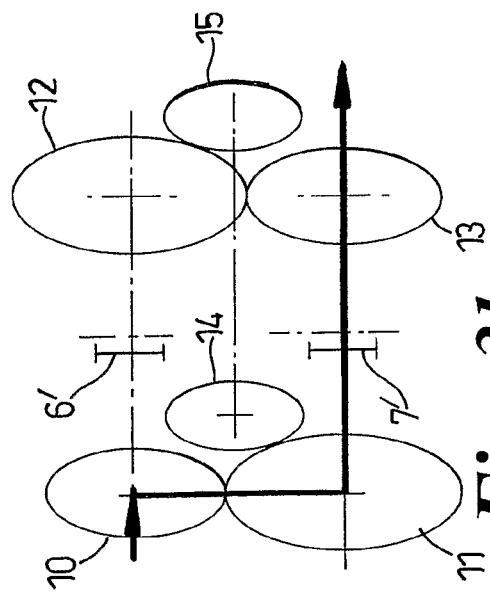
Figure 3B:
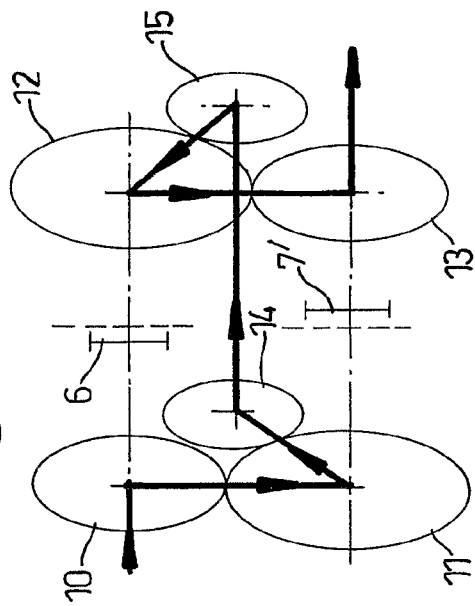
Figure 3C:
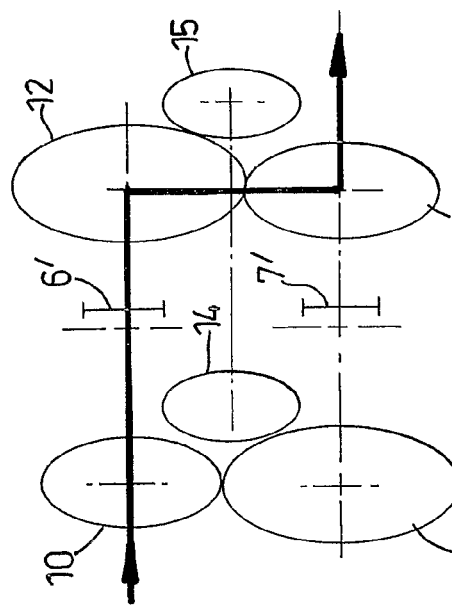
Figure 3D:
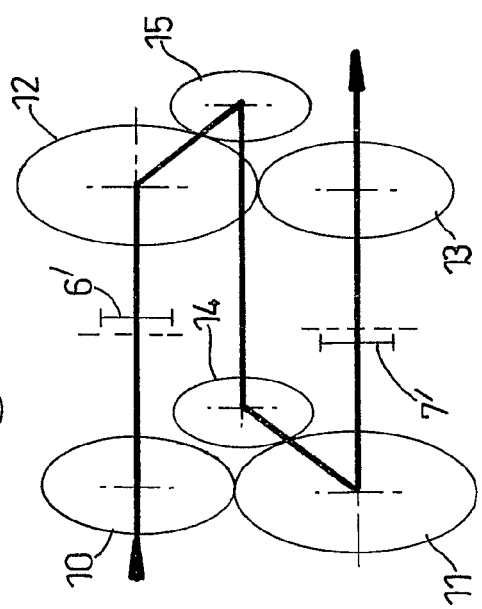
Figures 4, 5:
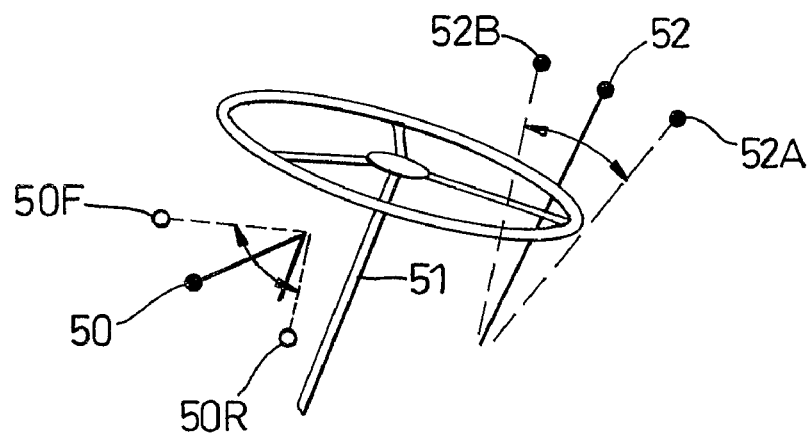
Figure 6A:
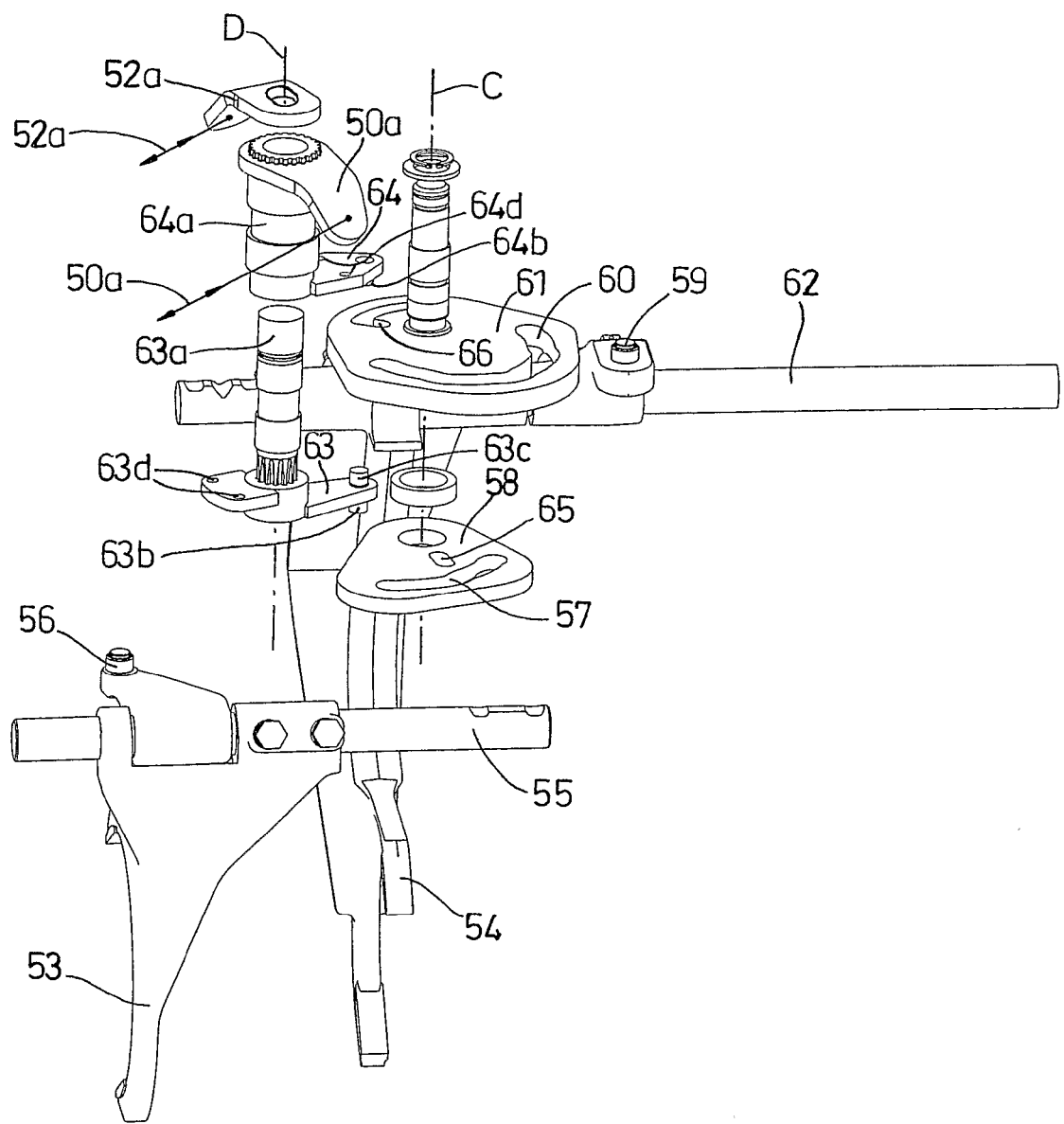
Figure 6B:
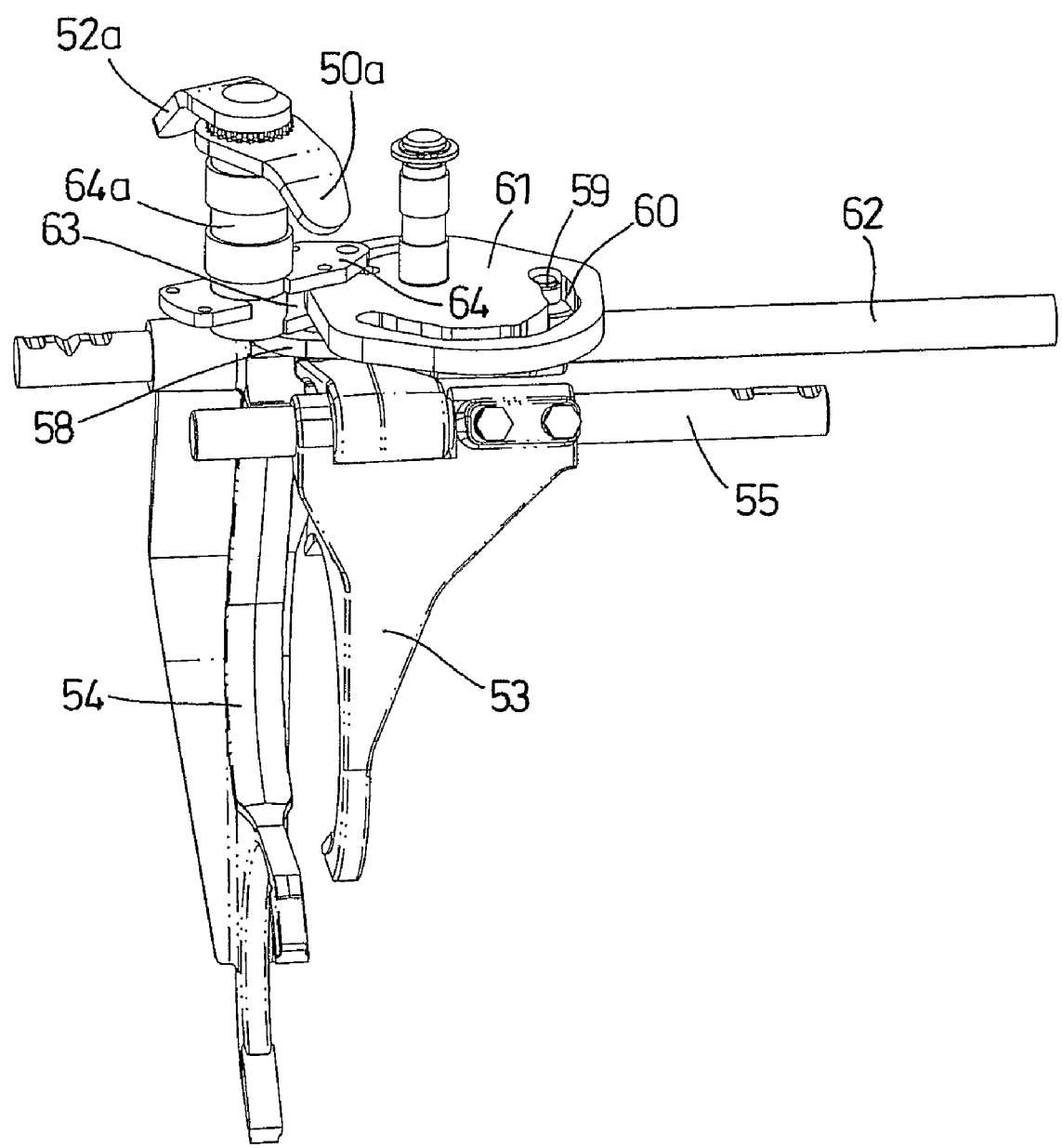
Figure 7:
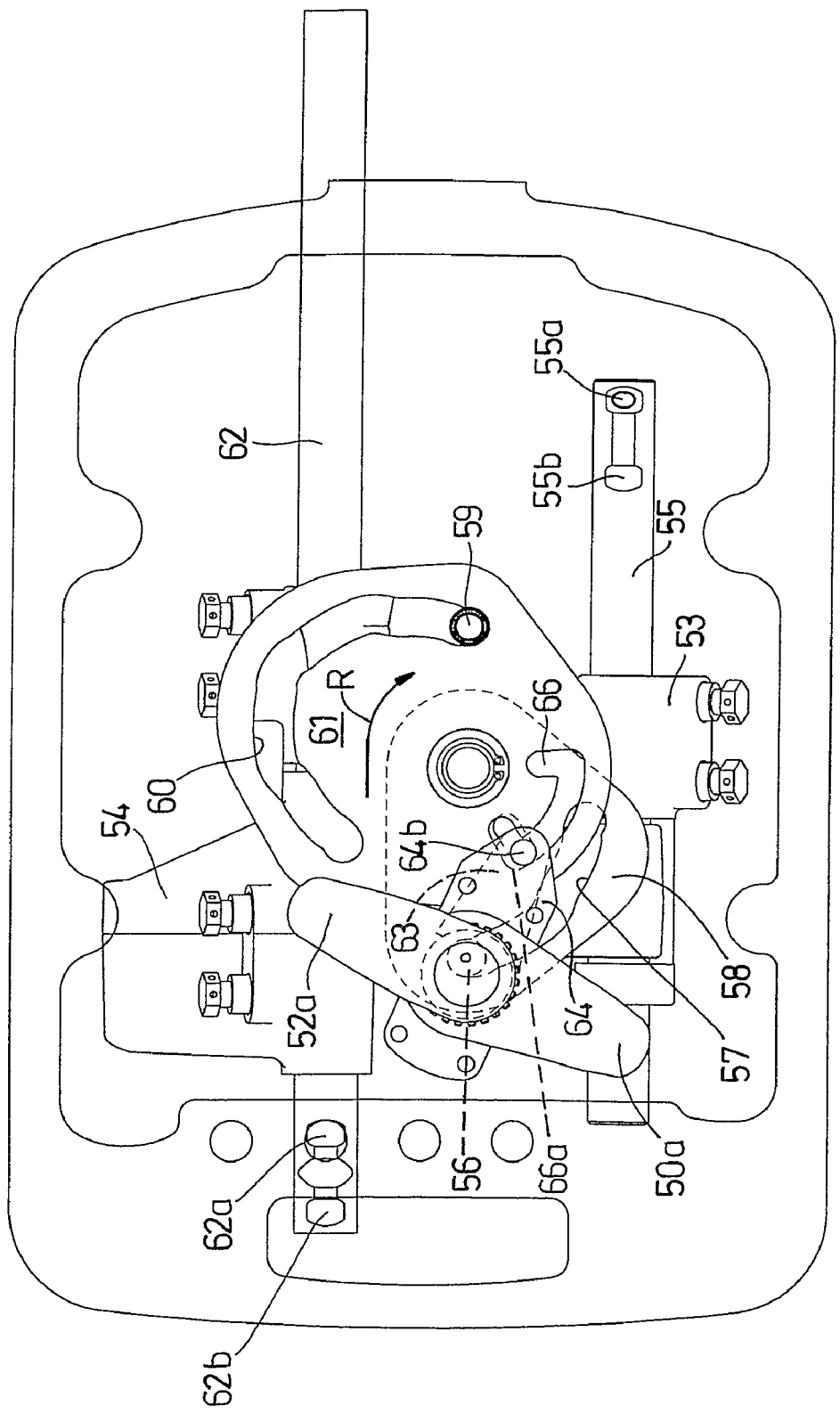
Figure 8:
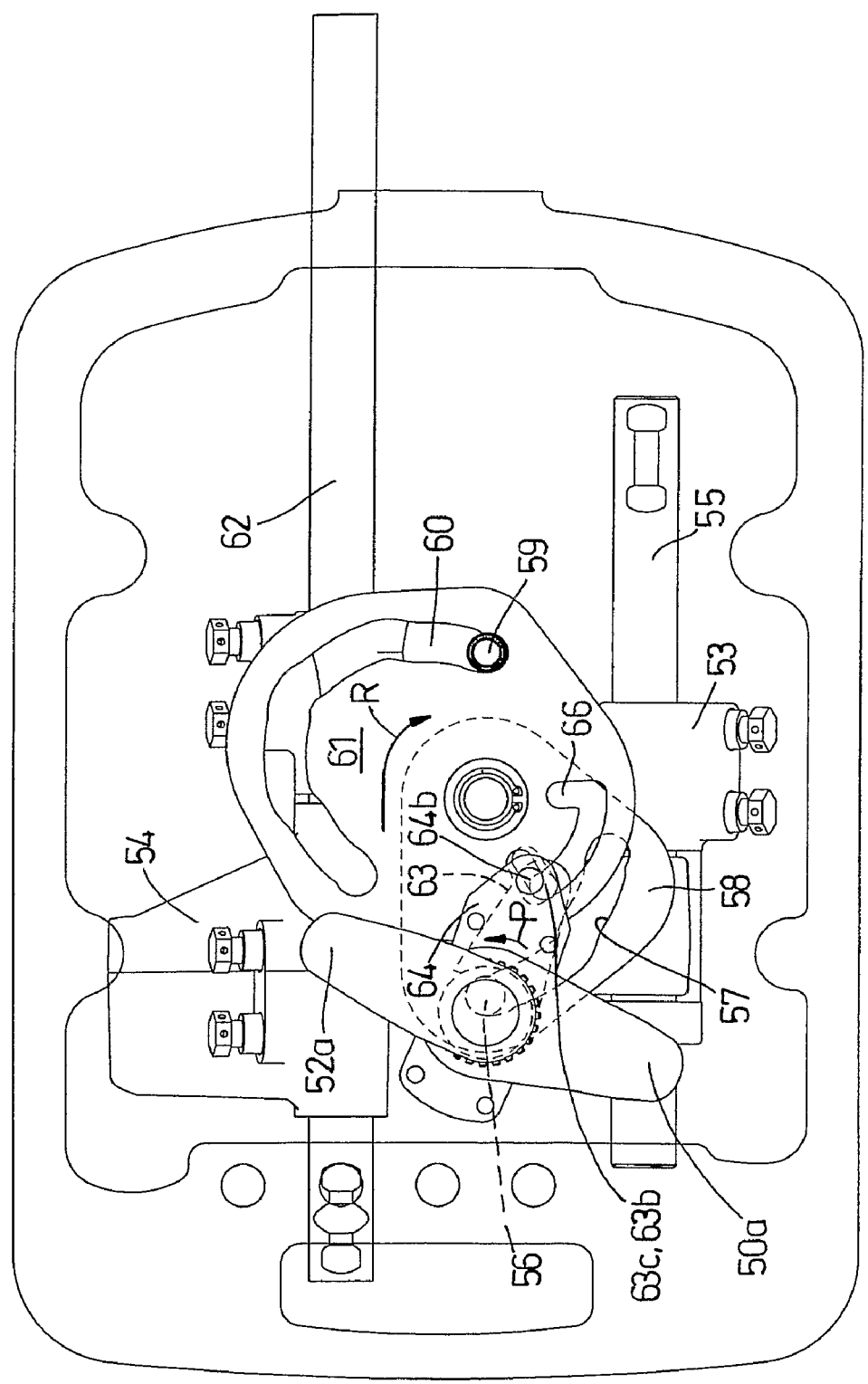
Figure 9:
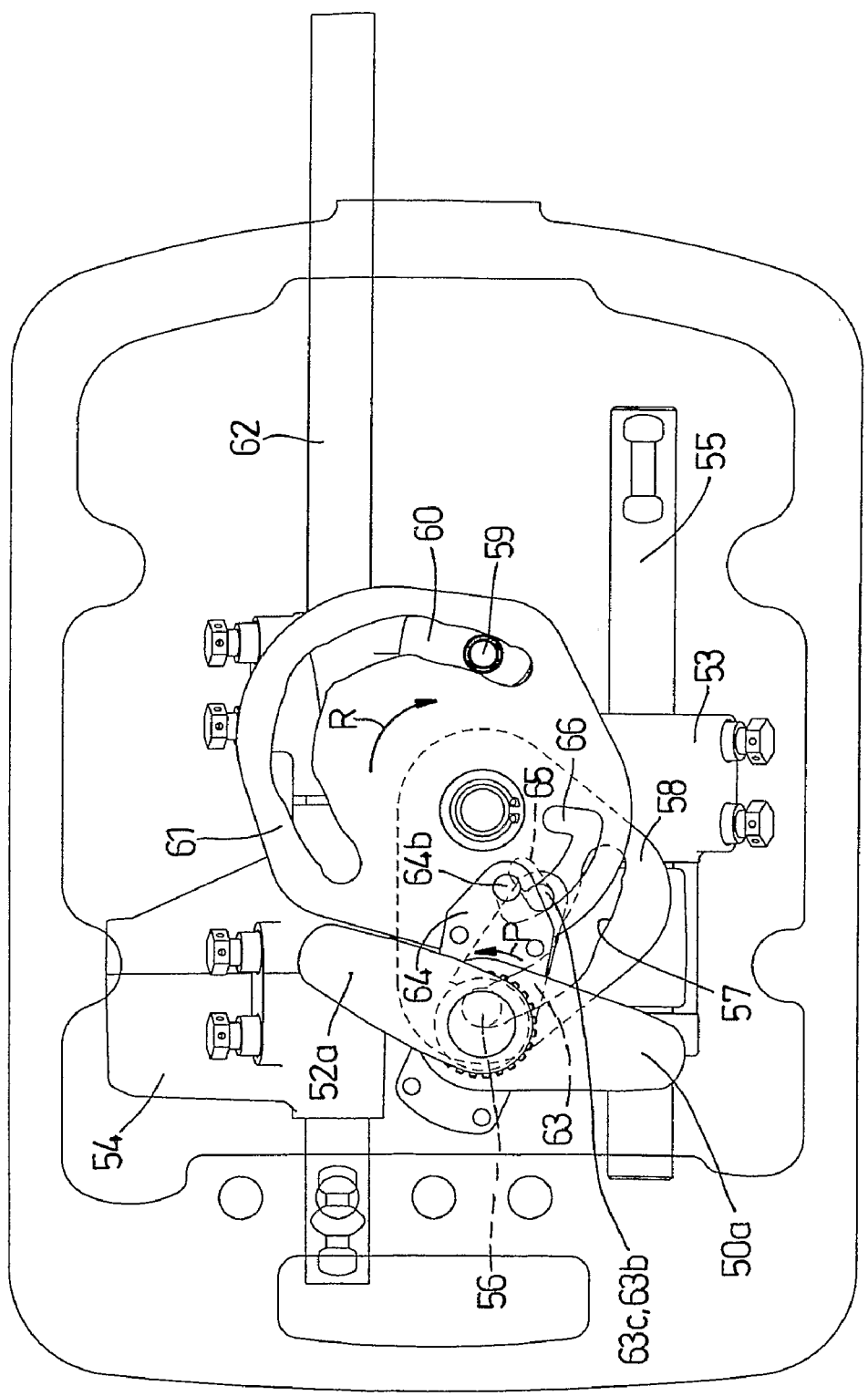
Figure 10:
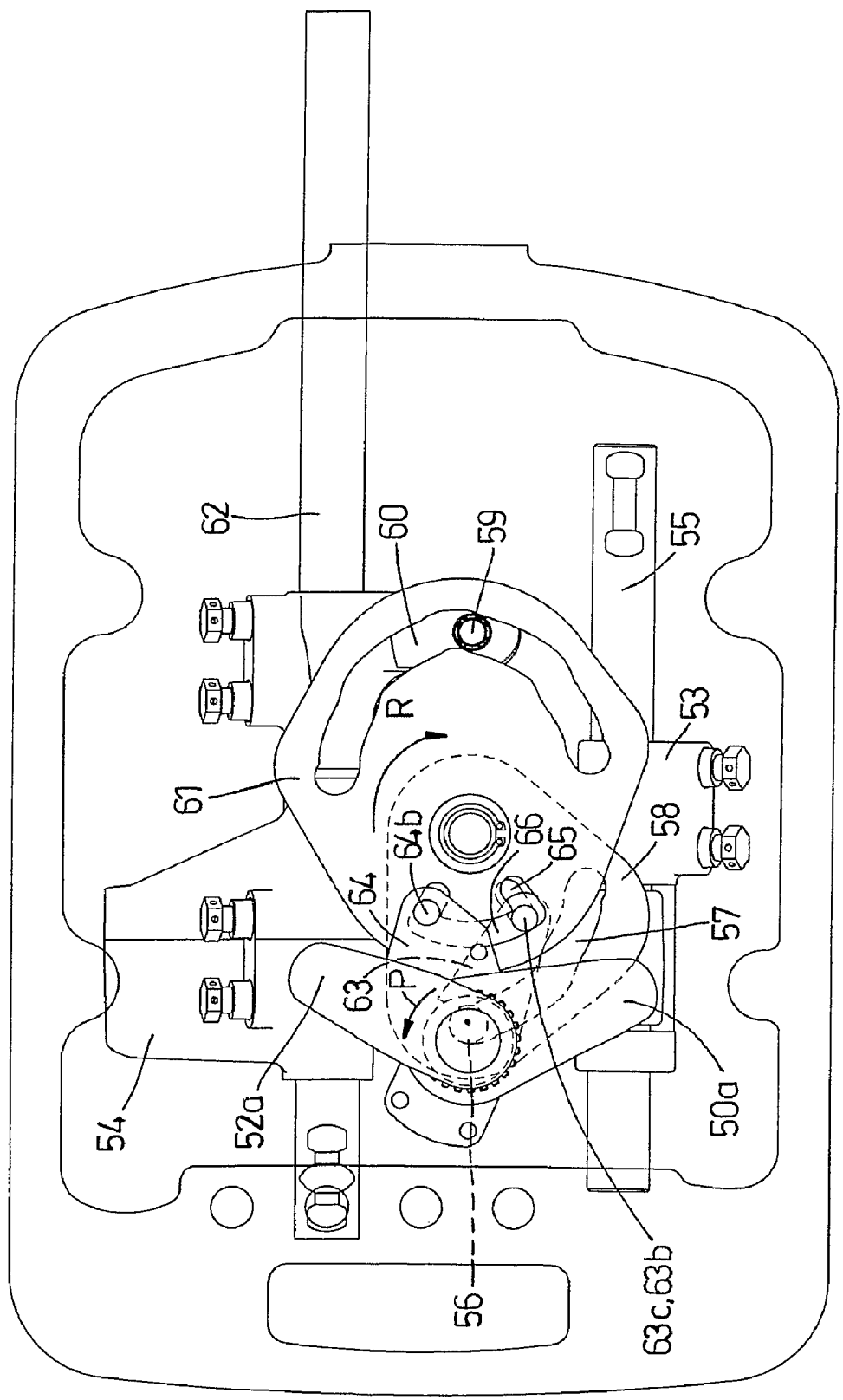
Figure 12:
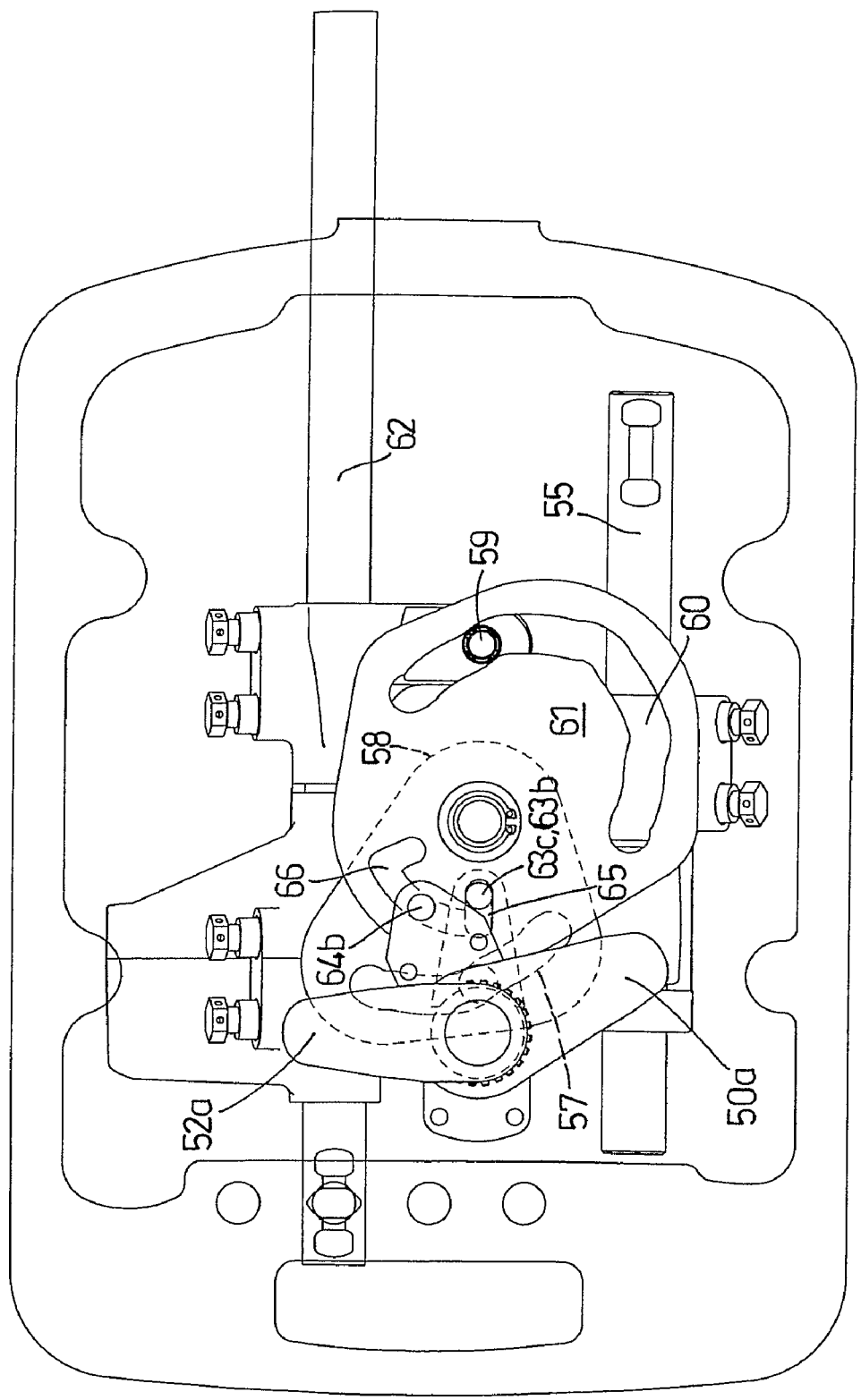
Figure 13:
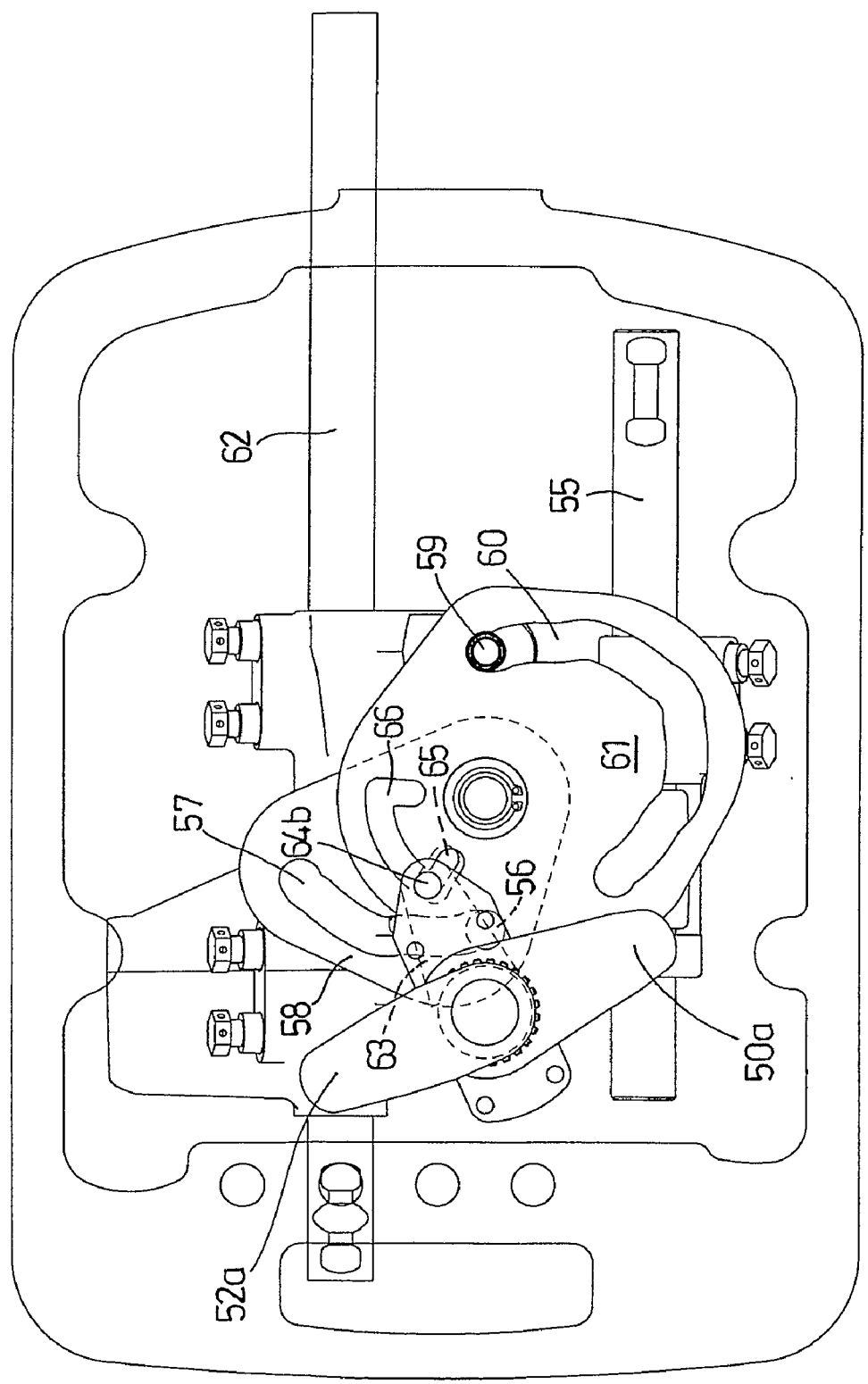
Figure 14:
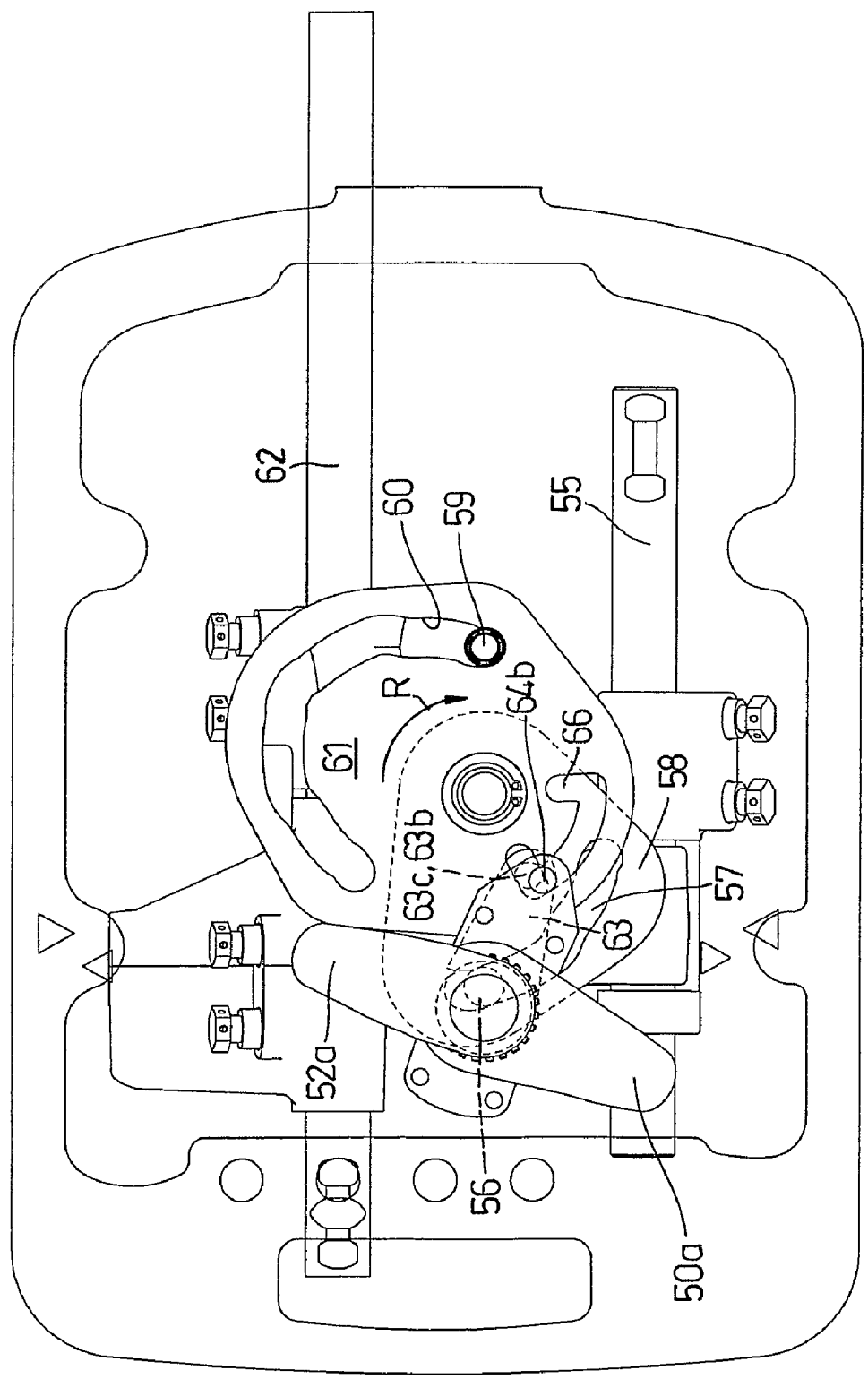
Figure 15:
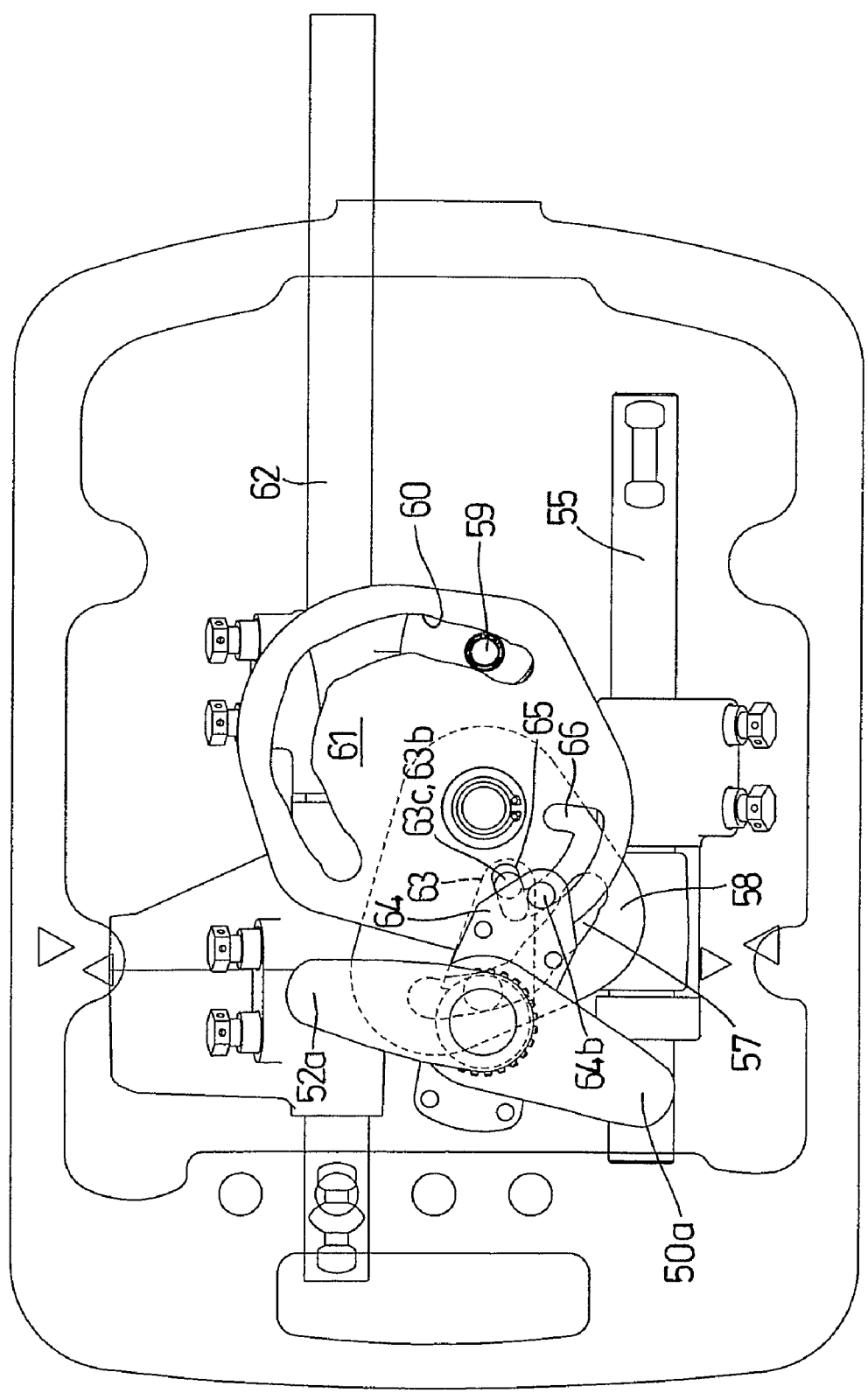
Figure 16:
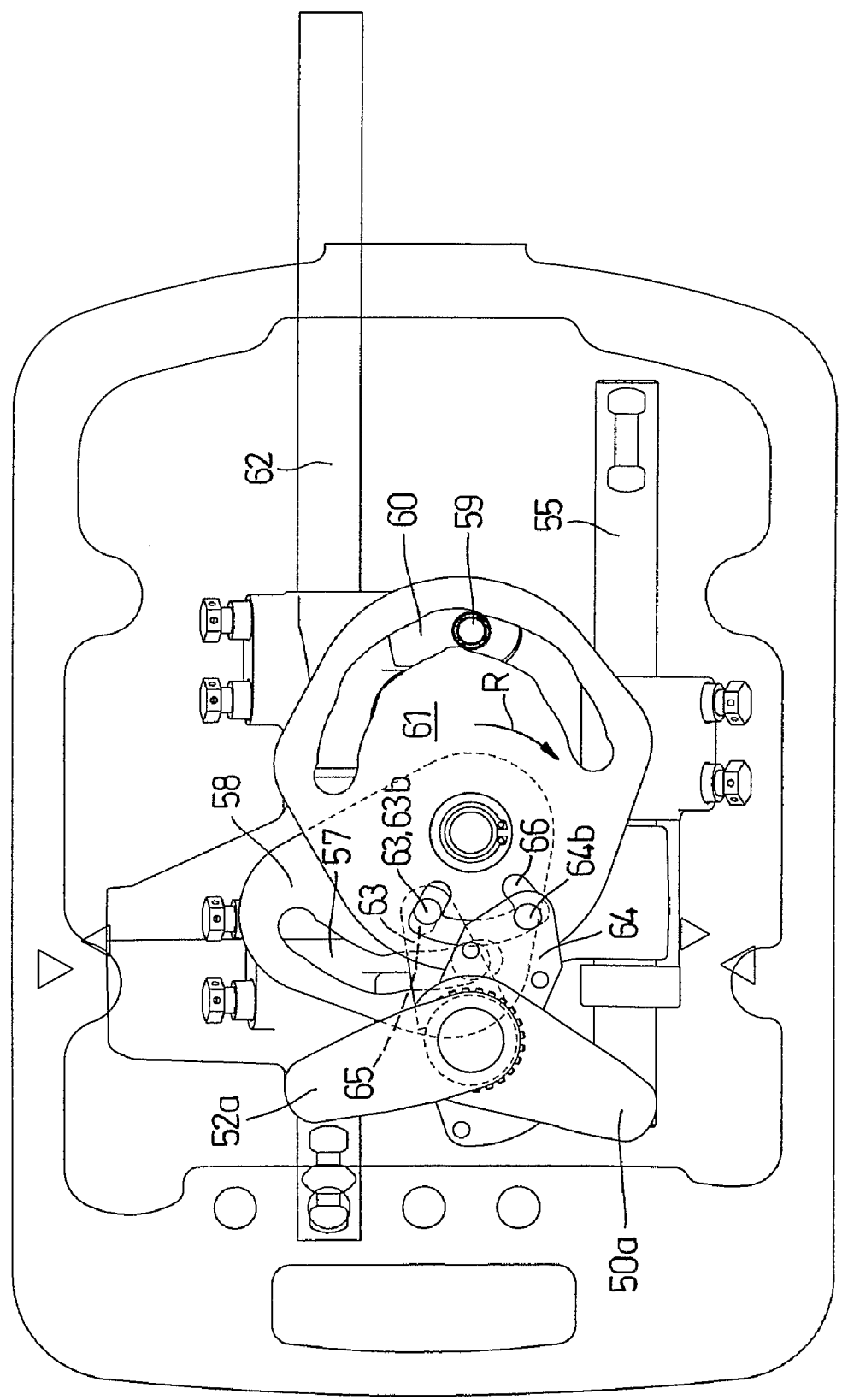
Figure 17:
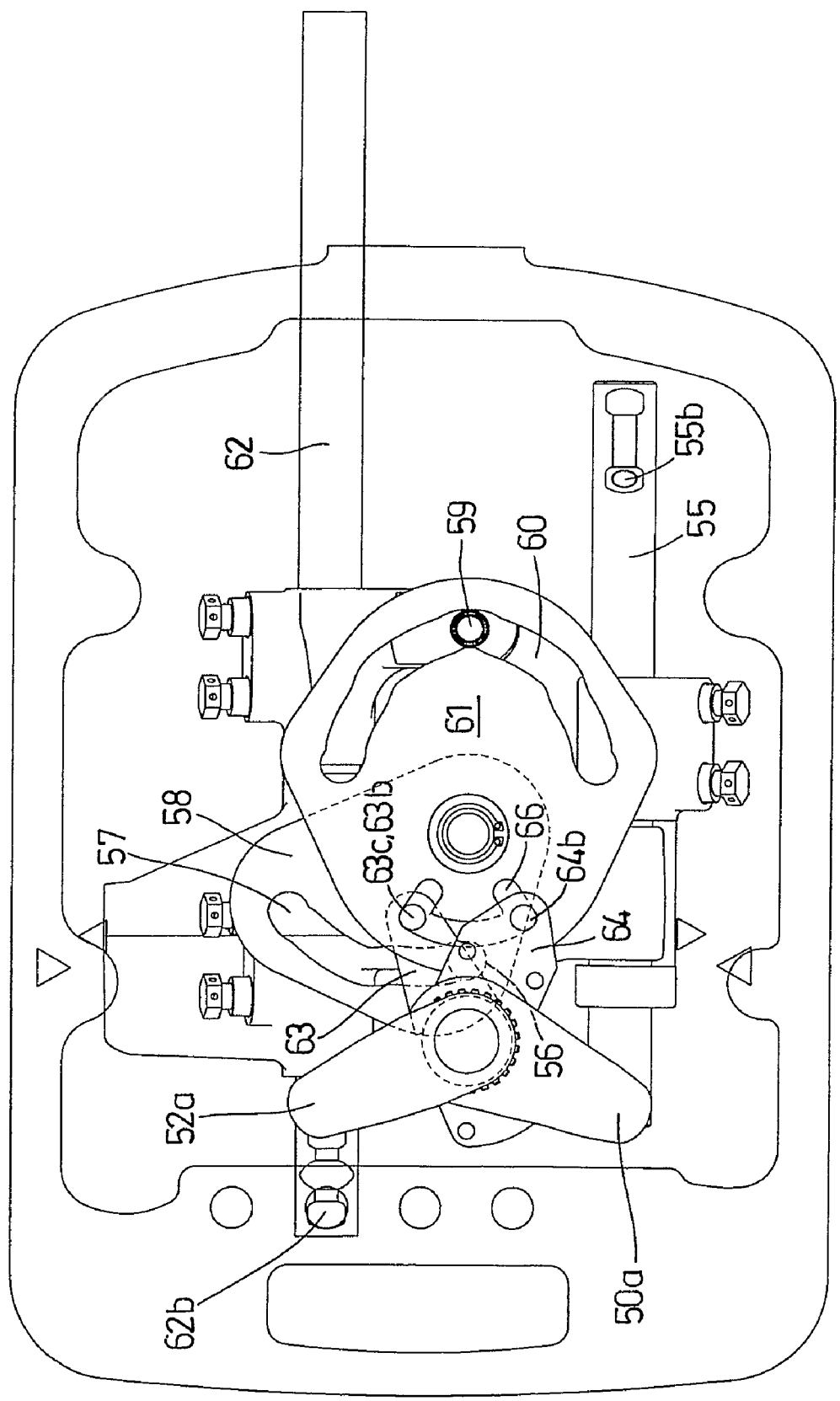

FIGS. 3a-3d-show the four drive conditions of the input stage of the transmission shown in FIG. 2;

FIG. 4 is a table of the coupler positions for the four drive conditions of FIGS. 3a-3d;

FIG. 5 is a diagrammatic view of the control levers used to control the selector mechanism of the present invention;

FIG. 6A is a perspective view of the selector mechanism of the present invention in an exploded condition;

FIG. 6B is the perspective view of FIG. 6A in an assembled condition;

FIG. 7 is a plan view of the selector mechanism of FIG. 6 in the forward low ratio engaged condition;

FIGS. 8 to 11 show various positions occupied by the selector mechanism as a change from forward low ratio to reverse low ratio is made;

FIGS. 12 and 13 show positions occupied by the selector mechanism as a change from reverse low ratio to reverse high ratio is made, and FIGS. 14 to 17 show various positions occupied by the selector mechanism as a change from a forward low ratio to a forward high ratio is made.

Figure 1:
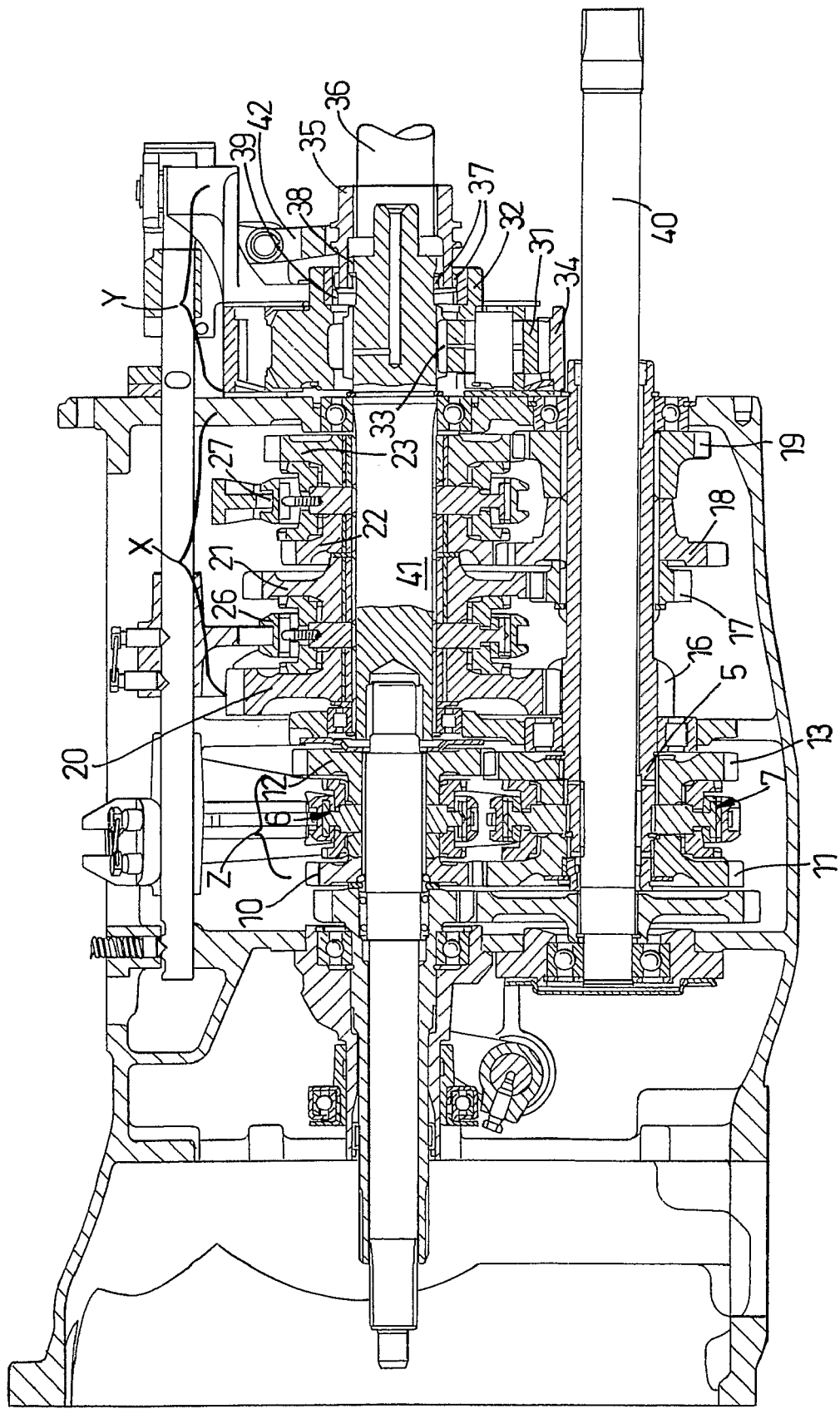
FIG. 1 shows a vertical section through a multi-ratio tractor transmission with an input stage controlled by a selector mechanism in accordance with the present invention.

The multi-ratio transmission shown in FIG. 1 comprises a main 4-speed change speed stage X, an output 2-speed high/low range change stage Y, and an input forward/reverse and A/B range stage Z The input stage Z, with which the present invention is concerned, is shown diagrammatically in FIG. 2 and comprises an input shaft 4 an output shaft 5 which loosely carry train gears 10, 12 and 11, 13 respectively. These gears may be coupled to their respective shafts by synchromesh units 6 and 7 with slidable couplers 6' and 7' respectively. An idler shaft 8 is also provided (see FIG. 2) with gears 14 and 15 which rotate with shaft 8 and mesh with gears 11 and 12 respectively.

The input stage Z is capable of providing two forward drive ratios and two reverse drive ratios in the manner shown in FIGS. 3a-3d.

Thus with both couplers 6' and 7' displaced to the right of their respective neutral positions, as shown in FIG. 3a, a higher forward drive ratio FB is obtained via gears 12 and 13. A lower forward drive ratio FA is obtained via gears 10 and 11 when both of the couplers are displaced to the left of their respective neutral positions a shown in FIG. 3b.

A higher reverse ratio RB is obtained via gears 12, 15, 14, 11 when coupler 6' is displaced to the right and coupler 7' to the left of their respective neutral positions as shown in FIG. 3c.

A lower reverse gear RA is obtained via gears 10, 11, 14, 15, 12 and 13 when coupler 6' is displaced to the left and coupler 7' to the right of their respective neutral positions as shown in FIG. 3d.

The positions of couplers 6' and 7' for each of the four ratios are summarised in tabular form in FIG. 4. It can be seen that to change between the forward and reverse directions only the lower coupler 7' is moved whereas to change between ratios A and B both couplers need to be moved simultaneously.

The main 4-speed change speed stage X comprises four gears 16, 17, 18 and 19 formed on or splined on to the shaft 5 which surrounds a PTO shaft 40 and on one end of which synchromesh unit 7 is mounted. These gears are in constant mesh with gears 20, 21, 22 and 23 which can be coupled to an output shaft 41 by synchromesh units 26 and 27 to provide four main ratios in the known manner.

The high/low output range change stage Y is of planetary form with planet gears 31 carried by planet carrier 32 meshing with annulus gear 34. A coupling sleeve 35 which is splined to transmission output shaft 36 has teeth 37 which can engage teeth 38 on shaft 41 to connect shafts 41 and 36 directly to provide a high range from stage Y or can engage teeth 39 on planet carrier 32 to connect shaft 41 and 36 via the reduction gearing provided by the planetary gear to provide the low range of stage Y. The sleeve 35 is moved between the two positions by a selector arm 42.

This transmission thus provides 2×4×2 (that is 16) ratios which can all be selected in forward or reverse.

Since the present invention is not concerned with the manner in which the operative ratio in stages X and Y is selected no further details of these stages will be given.

Regarding stage Z, the forward/reverse selection is made by moving a selector member in the form of a shuttle lever 50 to the left of the steering wheel 51 (see FIG. 5) either forwards or backwards (see positions 50F and 50R respectively) whilst the A/B range change selection is made by moving a selector member in the form of a range change lever 52 to the right of wheel 51 between positions 52A and 52B respectively.

Levers 50 and 52 operate the synchromesh couplers 6' and 7' via the selector mechanism shown in perspective in FIG. 6. In the arrangement shown in FIG. 6 a selector fork 53 moves the upper coupler 6' and a selector fork 54 moves the lower coupler 7'.

As can be seen from FIGS. 6A and 6B, fork 53 is moved with a selector rail 55 by a peg 56 which engages in a cam track 57 in a cam 58 which is pivoted relative to the transmission housing about a fixed axis C. Similarly fork 54 is moved with a selector rail 62 by a peg 59 which engages a cam track 60 in a cam 61 which is also pivoted relative to the transmission housing about axis C. Cams 61 and 58 are located one above the other and are pivoted about axis C by selector formations in the form of selector arms 63 and 64 which pivot about a fixed axis D and are moved by levers 52 and 50 respectively via linkages indicated diagrammatically at 52a and 50a respectively. Lever 50 is connected with selector arm 64 via linkage 50a and an outer sleeve 64a which surrounds a rod 63a which is connected with lever 52 via linkage 52a. Rod 63a moves selector arm 63.

Cam 58 has a track 65 for engagement with a peg 63b on arm 63 and cam 61 has a track 66 for engagements by a peg 63c on arm 63 and a peg 64b on arm 64.

Considering stage Z engaged in the forward low ratio (FA) shown in FIG. 3b in which both couplers 6' and 7' are positioned to the left of their neutral positions. In this ratio the cams and selector arms occupy the positions shown in FIG. 7 with the pegs 63b, 63c and 64b vertically above each other and the couplers held in the engaged condition by rail detents 55a and 62a respectively.

Figure 11:
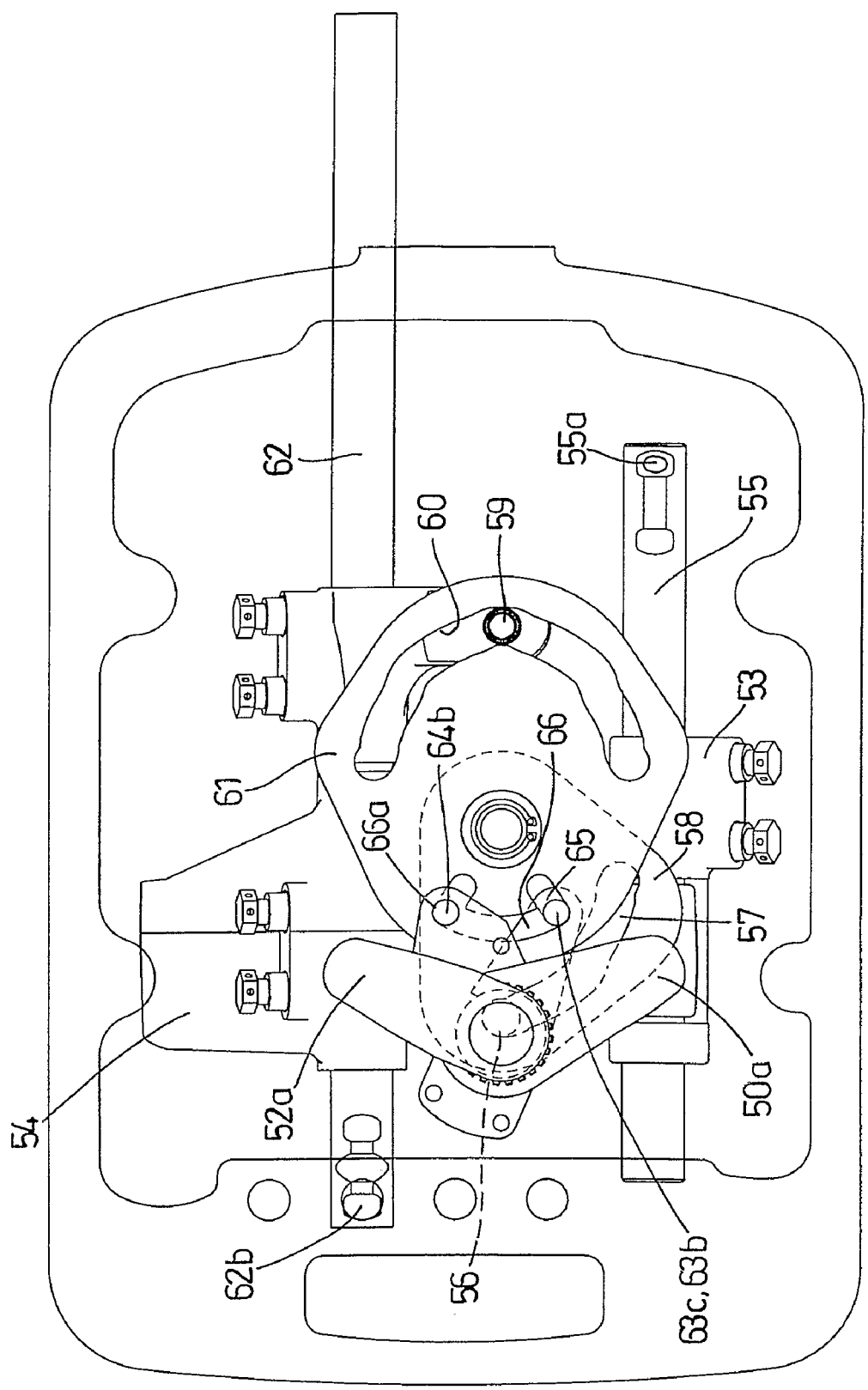

If the driver now wishes to change between the forward low ratio FA (FIG. 3b) to the reverse low ratio RA (FIG. 3d) only the lever 50 is moved between positions 50F and 50R. This movement of lever 50 moves only the selector arm 64 in direction P (see FIG. 8). The peg 64b of arm 64 engages track 66 in cam 61. This pivots cam 61 in direction R through the FIGS. 8, 9 and 10 positions until the peg 64b occupies the position in the corner 66a of track 66 as shown in FIG. 11. This movement of cam 61 moves selector rod 62, fork 54 and coupler 7' as peg 59 moves along track 60 so that coupler 7' is now located to the right of its neutral position as shown in FIGS. 3d and 11.

Similarly changes between the high forward ratio FB (FIG. 3a) and the high reverse ratio RB (FIG. 3c) are made by moving lever 50 between the positions 50F and 50R which again only moves selector arm 64 which in turn only moves cam 61 and hence only moves the lower coupler 7' only.

Changes between reverse low ratio RA (FIG. 3d) and reverse high ratio RB (FIG. 3c) are made by moving range change lever 52 between positions 52A and 52B. The position of the cams and selector arms for the reverse low ratio RA is shown in FIG. 11. Thus movement of lever 52 from the 52A position to the 52B position moves the selector arm 63 whose peg 63b engage track 57 in cam 58 and whose peg 63c engages track 66 in cam 61 so that cams 58 and 61 are moved through the FIG. 12 position to the position shown in FIG. 13. This moves forks 53 and 54 to the opposite sides of their neutral positions via pegs 56 and 59 respectively If the driver decides to change from the forward low ratio FA shown in FIG. 3b and FIG. 7 to the forward high ratio FB shown in FIG. 3a and FIG. 17 he moves the range change lever 52 from position 52A to position 52B. This moves only the selector arm 63 which engages tracks 65 and 66 via pegs 63b and 63c as described above. Thus both cams 58 and 61 are pivoted in direction R of FIG. 7 with pegs 63b and 63c moving along tracks 65 and 66 through the FIGS. 14, 15 and 16 positions to the FIG. 17 position. Thus both selector rods and couplers are moved to the right of their neutral positions by the movement of pegs 56 and 59 along tracks 57 and 60 respectively and are held in the engaged condition by rail detents 55b and 62b respectively.

Similarly changes between the forward high ratio FB and the forward low position FA are made by movement of range change lever 52 between positions 52A and 52B which moves only selector arm 63 which engages both tracks 65 and 66 to move both selector rods and couplers between the FIGS. 3a and 3b positions.

The remaining ratio changes between forward low FA (FIG. 3b) and reverse high RB (FIG. 3c) and between forward high FB (FIG. 3a) and reverse low RA (FIG. 3d) which involve both a direction change and a ratio change are made in two parts which are combinations of the changes already described above.

Thus, for example when changing from forward low ratio FA to reverse high ratio RB the driver first changes from FA to FB using lever 50 as described above and then to RB using lever 52. Similarly when changing from forward high FB to reverse low RA the driver first changes from FB to FA using lever 52 as described above and then to RA using lever 52.

Although the invention has been described above as using shift rail detents to hold the transmission in its engaged condition it may be that no such detents are necessary or that detents could be provided on the parts of the shifting mechanism. For example, arms 63 and 64 may be provided with spring-loaded balls 63d and 64d respectively which engage recesses (not shown) in the gearbox casing to hold the arms and hence the associated selectors in the various engaged positions of the gearbox.

The cam tracks in 60 and 57 are also designed so that the driver experiences a more or less constant force as he moves the levers during ratio and direction changes in the transmission.

It will therefore be appreciated that the present invention provides an efficient transmission selector mechanism for controlling transmission input stage Z using lever 50 and 52 which is easy for the operator to use.

The invention claimed is:

1. A transmission selector mechanism for controlling a gearbox which provides forward and reverse direction and high and low ratios using two coupling members (6',53,7',54) each axially slideable into position on either side of a respective neutral position to couple a selected one of a pair of gears (10,12:11,13) to an associated shaft (4,5), the mechanism comprising:

a driver operated forward and reverse selector member (50) and a driver operated high and low ratio selector member (52), wherein the forward and reverse selector member (50) moves a first selector formation (64,64b) which is engageable with a first coupling formation means (66) on a first cam (60) which moves one (7',54) of the coupling members, wherein the high and low selector member (52) moves a second selector formation (63,63*b*,63*c*) which is engageable with a second coupling formation means (65) on a second cam (58) which moves the other coupling member (6', 53), wherein one of the selector formations (63,63*b*,63*c*) engages both coupling formation means (66,65) for simultaneous movement of both couplers (6',53:7',54) when selecting both direction and ratio changes with one of the selector members (50,52); and wherein upon movement of one of the selector members (50,52), the coupling members (6',53:7',54) can be positioned in positions either on the same side or on opposite sides of their respective neutral positions.

2. A selector mechanism according to claim 1 wherein the selector formation (63,63*b*,63*c*) connected with the high and low ratio changes engages both coupling formations (65,66).

3. A selector mechanism according to claim 1 wherein the cams are located one (61) above the other (58) and pivot about the same aligned axes (C).

4. A selector mechanism according to claim 1, wherein the first selector formation (64,64*b*) connected with the forward and reverse selector member (50) engages the first coupling formation means in the form of a first cam track (66) in the first cam (61), and the second selector formation (63,63*b*,63*c*) connected with the high and low selector member (52) engages the first cam track (66) and also engages the second coupling formation means in the form of a second cam track (65) in the second cam (58).

5. A selector mechanism according to claim 1, wherein the selector formations include selector arms (63,64) connected to the ends of concentric selector shafts (63*a*,64*a*) operated by the selector members (52,50).

6. A selector mechanism according to claim 1. wherein each cam (58,61) has a further cam track (57,60) engageable by a follower (56,59) connected with the associated coupling member (6',53:7',54) so that pivoting of each cam causes coupling and uncoupling movement of the associated coupling member as the follower follows its respective further cam track.

7. A selector mechanism according to claim 1, wherein each coupler (6',7') includes a selector fork (53,54) mounted on a selector rail (55,62), the rails each having detent means (55*a*,55*b*:62*a*,62*b*) to hold the rails in coupler engaged positions one on each side of a central neutral position.

8. Transmission comprising a transmission selector mechanism according to claim 1.

* * * * *